US007478156B1

(12) United States Patent
Pereira

(10) Patent No.: US 7,478,156 B1
(45) Date of Patent: Jan. 13, 2009

(54) NETWORK TRAFFIC MONITORING AND REPORTING USING HEAP-ORDERED PACKET FLOW REPRESENTATION

(75) Inventor: Pratap Pereira, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1040 days.

(21) Appl. No.: 10/670,944

(22) Filed: Sep. 25, 2003

(51) Int. Cl.
*G06F 15/173* (2006.01)
(52) U.S. Cl. ........................... 709/224; 709/234
(58) Field of Classification Search ............... 709/224, 709/234
See application file for complete search history.

(56) References Cited

U.S. PATENT DOCUMENTS

| 6,847,613 | B2* | 1/2005 | Mimura et al. ............. 370/235 |
| 6,910,213 | B1* | 6/2005 | Hirono et al. ............. 718/108 |
| 6,961,689 | B1* | 11/2005 | Greenberg ................. 703/17 |
| 6,990,102 | B1* | 1/2006 | Kaniz et al. ................ 370/392 |
| 7,031,313 | B2* | 4/2006 | Yazaki et al. .............. 370/392 |
| 2003/0179705 | A1* | 9/2003 | Kojima ...................... 370/230 |
| 2003/0223361 | A1* | 12/2003 | Hussain et al. ............ 370/230 |
| 2004/0078493 | A1* | 4/2004 | Blumrich et al. .......... 709/250 |

* cited by examiner

*Primary Examiner*—John Follansbee
*Assistant Examiner*—Dhairya A Patel
(74) *Attorney, Agent, or Firm*—Shumaker & Sieffert, P.A.

(57) ABSTRACT

Techniques are described for collecting and reporting statistics for packet flows within a network. A network device includes traffic flow accounting functionality to generate traffic flow statistics for the network. To aid the analysis of the flow statistics and reporting of the flow statistics to clients, the network device maintains packet flow identifiers in the form of one or more heap tables, i.e., in heap-ordered fashion. Each packet flow identifier, e.g., index or pointer, within the heap table corresponds to one of the packet flows, and may be used to retrieve the traffic flow statistics associated with the respective packet flow. The network device updates the flow statistics and the heap table in real-time. Upon receiving client queries, the network device creates clones of the heap table and applies a truncated heap sort algorithm to quickly respond to the queries.

33 Claims, 7 Drawing Sheets

NETWORK TRAFFIC MONITORING AND REPORTING USING HEAP-ORDERED PACKET FLOW REPRESENTATION

TECHNICAL FIELD

The invention relates to computing devices and, more particularly, to techniques for analyzing and reporting traffic flows within computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Transmission Control Protocol/Internet Protocol (TCP/IP).

A user, such as a system administrator, often makes use of a network analysis device to monitor network traffic and debug network problems. For example, the user may make use of a network analyzer, which is a stand-alone device that captures data from a network and displays the data to the user. Alternatively, other network devices, such as routers, gateways, and the like, may incorporate traffic flow analysis functionality.

The network analysis devices typically monitor and collect packets having network information that matches criteria specified by the user. For example, the user may specify a source and destination Internet Protocol (IP) addresses, source and destination port numbers, protocol type, type of service (ToS) and input interface information. The network analysis devices typically collect packets matching the specified criteria, and construct flow analysis diagrams. The user may then view the information collected for network traffic flowing between devices on the network. The information may be used for network planning, traffic engineering, network monitoring, usage-based billing and the like.

Some systems forward a copy of the network traffic to a network analysis device for batch processing. Other network devices attempt to analyze the data locally and resolve user queries in "real time." One challenge associated with this latter approach is that the data being collected and reported, i.e., traffic flow statistics, is continuously being updated. In other words, the statistics for the various packet flows must be continuously updated as traffic continues to flows through the network. Consequently, it is often difficult to analyze the data at any particular point in time in order to respond to a user query, such as a request for the largest packet flows through the network. This task is further compounded by the immense volume of traffic that may be flowing through the network. To further complicate the process, multiple queries may be received concurrently from different users.

SUMMARY

In general, the invention is directed to techniques for collecting and reporting statistics for packet flows within a network. A network device includes traffic flow accounting functionality to generate traffic flow statistics for the network. To aid the analysis of the flow statistics and accelerate the response to client queries, the network device maintains packet flow identifiers in the form of one or more heap tables. Each packet flow identifier, e.g., index or pointer, within the heap table corresponds to one of the packet flows, and may be used to retrieve the traffic flow statistics associated with the respective packet flow. The network device makes use of the heap tables and the packer flow identifiers to perform network analysis and resolve user queries in real-time while continuing to update the network traffic statistics.

The network device processes the heap table to quickly and efficiently respond to queries from clients, such as system administrators and automated scripts. Upon receiving a query from a client, the network device clones the heap table, i.e., makes a copy the heap table. The network device then performs heap operations on the cloned heap table to obtain the flow statistics specified by the query. During this process, the network device continues to update the traffic flow statistics and the original heap table.

In one embodiment, a method comprises calculating traffic statistics associated with packet flows through a network, and maintaining a heap that provides a heap-ordered representation of the packet flows. The method further comprises processing the heap to select one or more of the packet flows, and outputting the traffic statistics associated with the selected packet flows.

In another embodiment, a method comprises maintaining a heap that provides a heap-ordered representation of packet flows within a network based on at least one criteria associated with the packet flows, and processing the heap to output traffic statistics associated with an ordered subset of the packet flows.

In another embodiment, a method comprises maintaining a data structure that stores N packet flow identifiers for packet flows within a network; and receiving a query from a network client, wherein the query requests traffic flow statistics for M packet flows selected from the N packet flows based on an ordered relationship to a criteria. The method further comprises applying an algorithm to process the data structure to identify the M packet flows in a computational time that can be represented as less than or equal to $O(M\log(N))$, and outputting the traffic statistics associated with the M packet flows.

In another embodiment, a computer-readable medium comprises instructions. The instructions cause a programmable processor to calculate traffic statistics associated with packet flows through a network, and maintain a heap that provides a heap-ordered representation of the packet flows. The instructions further cause the processor to process the heap to select one or more of the packet flows, and output the traffic statistics associated with the selected packet flows.

In another embodiment, network elements comprising an interface to receive packets flows from a network, and a control unit coupled to the interface. The control unit computes flow statistics for the packets, and maintains identifiers for the packet flows in a heap-ordered representation based on at least one of the statistics.

In another embodiment, a network device comprising an interface to receive packets flows from a network, a control unit coupled to the interface and an accounting service card, wherein the control unit forwards the packets to the accounting service card to calculate the traffic statistics, wherein the accounting service card computes flow statistics for the packets, and maintains maintaining a heap that provides a heap-ordered representation of the packet flows.

The techniques may provide one or more advantages. For example, according to the principles of the invention, the network device may apply a truncated heap sort algorithm to process the heap table. If a client requests the largest M packet flows based on packet count, for example, the network device need only apply M−1 "heapify" operations to the heap table in order to identify the largest M flows.

In addition, the use of cloned heap tables allows the original heap table to be continuously updated while the cloned heap tables are processed to satisfy the queries. In this manner, the network device may be viewed as partitioning the traffic flow statistics into a first partition that may be updated in real-time and a second partition that may be destructively processed to satisfy the queries.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
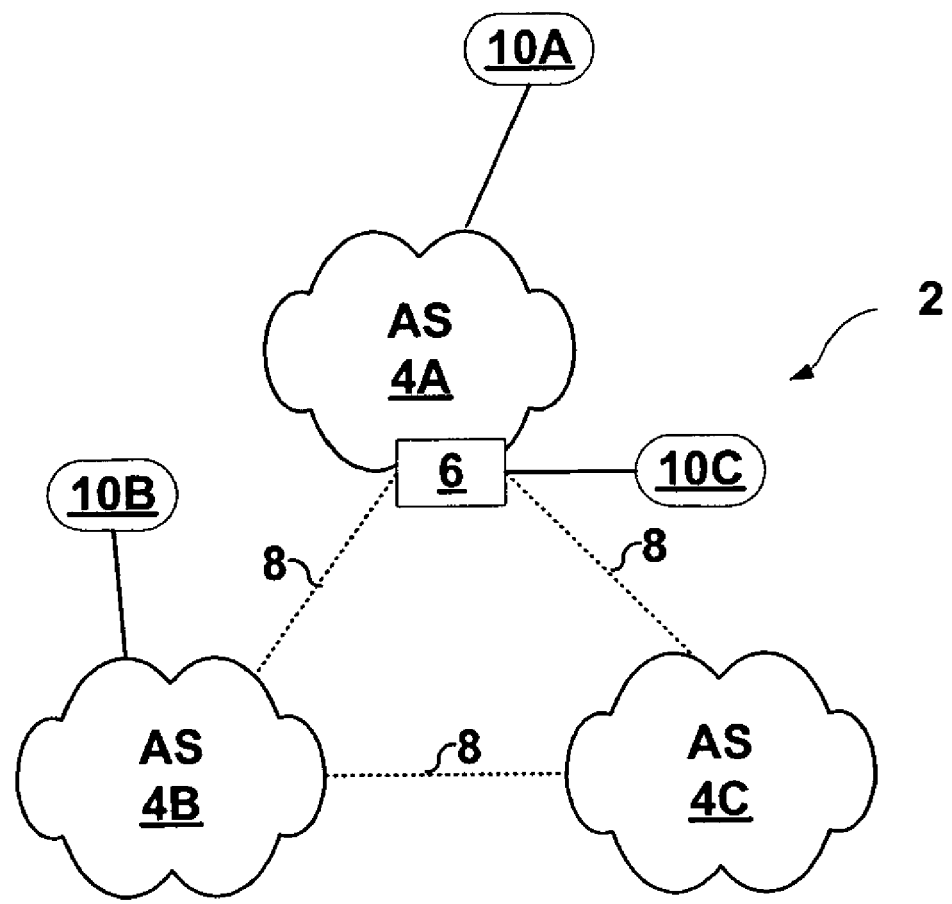
FIG. 1 is a block diagram illustrating an exemplary computing network formed by an interconnected group of autonomous systems.

FIG. 1 illustrates an exemplary computing network 2 formed by autonomous systems 4A-4C (herein autonomous systems 4) interconnected via communication links 8. Each of autonomous systems 4 represents an independent administrative domain having a variety of networked resources capable of packet-based communication. For example, autonomous systems 4 may include servers, workstations, network printers and faxes, gateways, routers, and the like. Each of autonomous systems 4 includes one or more devices, e.g., routers, for sharing routing information with, and forwarding packets to, the other autonomous systems via communication links 8.

The term "packet" is used herein to generally describe a unit of data communicated between resources in conformance with a communication protocol. The principles of the invention may be readily applied to a variety of protocols, such as the Transmission Control Protocol (TCP), the User Datagram Protocol (UDP), the Internet Protocol (IP), Asynchronous Transfer Mode, Frame Relay, and the like. Accordingly, "packet" is used to encompass any unit of data, and may be interchanged with the term "cell," or other similar terms used in such protocols to describe a unit of data communicated between resources within the network.

As described, network device 6 includes traffic flow accounting functionality to generate traffic flow statistics for network 2. Network device 6 may comprise a dedicated traffic analysis device, i.e., a network analyzer. Alternatively, network device 6 may be any network device in which traffic analysis and reporting functionality is integrated, such as a router, hub, gateway, switch, and the like.

Network device 6 may include, for example, at least one accounting module that generates flow statistics for traffic within network 2. The accounting module may take the form of software, hardware, or combinations thereof. Moreover, the accounting module may be integrated within network device 6, or may be provided as a field-replaceable unit, e.g., an interface card.

The accounting module may maintain the flow statistics in any of a variety of forms, such as one or more tables, databases, linked lists, and the like. For example, the accounting module of network device 6 may maintain the traffic flow statistics in the form of one or more flow tables. Moreover, the accounting module may maintain a variety of flow statistics including, for example, packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, and the like, for each packet flow. As network device 6 captures packets from one or more links 8 within network 2, the accounting module may associate the network packets with respective packet flows and update flow statistics for the respective packet flows.

Network device 6 provides a user interface (not shown) with which clients 10A-10B (collectively clients 10) interact to view the generated traffic flow statistics. In particular, clients 10 may issue queries to analyze and view the traffic flow statistics. For example, clients 10 may issue queries requesting detailed information for the ten largest traffic flows based on byte count. As another example, clients 10 may issue queries requesting detailed traffic flow statistics for the sixth through tenth largest flows based on the packet count for each flow.

In response, network device 6 may analyze the traffic flow statistics, and report the results of the analysis to clients 10 via the user interface. In the illustrated example, clients 10A and 10B remotely interact with the user interface of network device 6. Client 10C directly interacts with the user interface via an input mechanism, e.g., a keyboard, coupled to network device 6. Clients 10 may be users, such as system administrators, or automated scripts.

Network device 6 may maintain packet flow identifiers in the form of one or more heap tables. Each packet flow identifier, e.g., index or pointer, within the heap table corresponds to one of the packet flows, and may be used to retrieve the traffic flow statistics associated with the respective packet flow. Network device 6 processes the heap table to quickly and efficiently respond to queries from clients 10. For example, in response to a query, network device 6 may process the heap table to quickly identify the largest packet flows sorted according to byte count in the heap table. In this manner, network device 6 need not process the traffic statistics, which may be voluminous, and need only process the heap table.

Upon receiving a query from one of clients 10, network device 6 clones the heap table, i.e., makes a copy the heap table. Network device 6 then performs heap operations on the cloned heap table to obtain the flow statistics specified by the query. During this process, network device 6 may perform destructive operations on the cloned heap table in order to extract the desired traffic flow statistics. The accounting module continues to update the traffic flow statistics and the original heap table during this process.

In instances where network device 6 processes multiple queries, the network device may make a clone of the heap table for each query. Network device 6 applies heap operations to the cloned heap tables to determine the results for the respective query. Clients 10 can then utilize the returned information in a variety of ways, e.g., to counter a malicious attack, provide accurate billing based on usage, troubleshoot network errors and the like. In this manner, network device 6 makes use of the heap tables to efficiently analyze dynamic flow statistics and provide a comprehensive traffic analysis environment.

Figure 2:
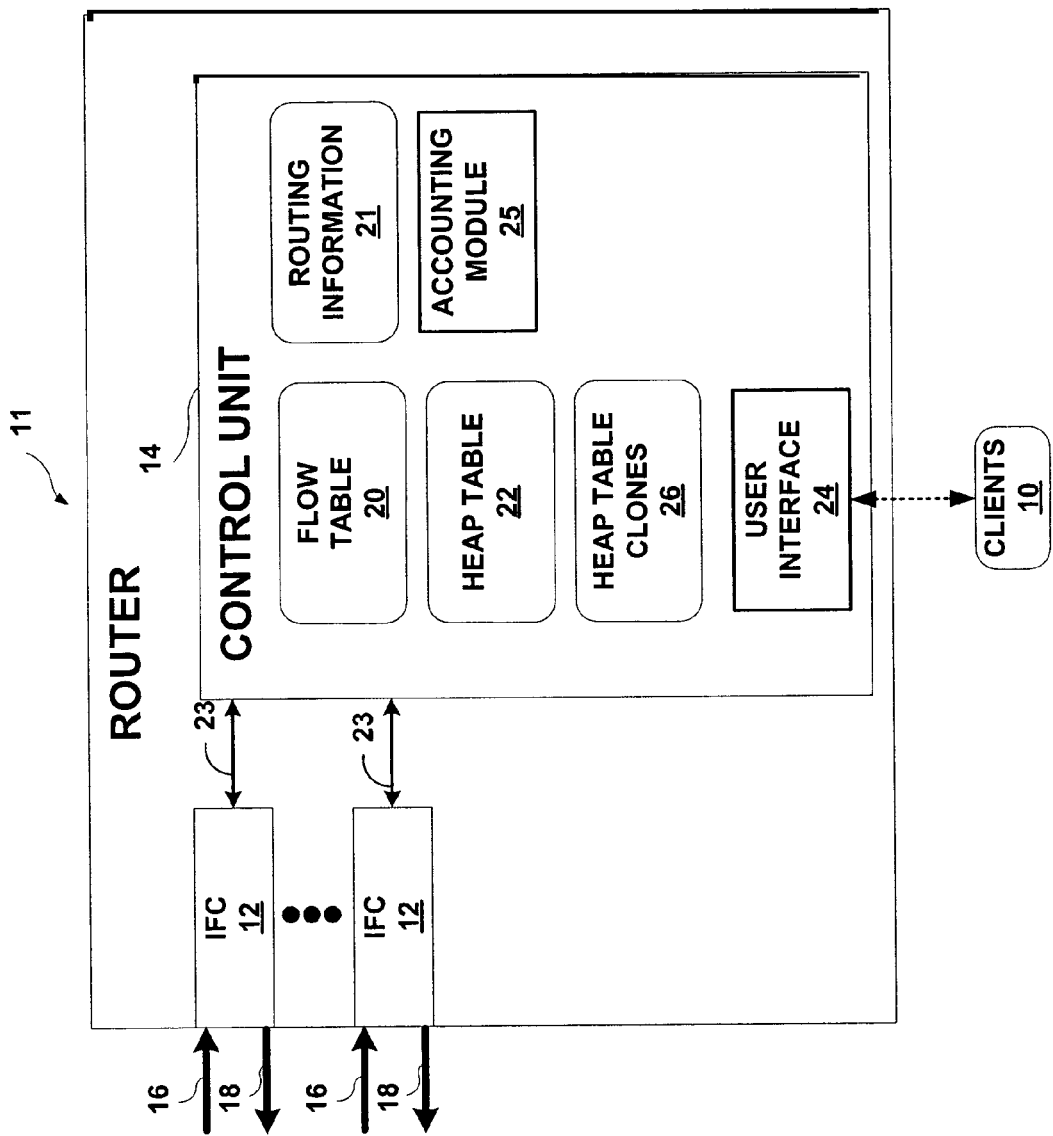
FIG. 2 is a block diagram illustrating an example embodiment of a router consistent with the principles of the invention.

FIG. 2 is a block diagram illustrating an example embodiment of a router 11 consistent with the principles of the invention. Router 11 includes a control unit 14 that maintains routing information 21 that describes the topology of a network, including routes through the network. Control unit 14 periodically updates routing information 21 to accurately reflect the topology of the network. Control unit 14 may maintain routing information 21 in the form of one or more tables, databases, link lists, radix trees, databases, flat files, or any other data structures.

Router 11 further includes interface cards interface cards (IFCs) 12 that receive and send packet flows via network links 16 and 18, respectively. IFCs 12 are typically coupled to network links 16, 18 via a number of interface ports (not shown), and forward and receive packets and control information to and from control unit 11 via a respective interface 23. Router 11 may include a chassis (not shown) having a number of slots for receiving a set of cards, including IFCs 12. Each card may be inserted into a corresponding slot of the chassis for electrically coupling the card to control unit 14 via a bus, backplane, or other electrical communication mechanism.

In operation, router 11 receives inbound packets from network links 16, determines destinations for the received packets, and outputs the packets on network links 18 based on the destinations. More specifically, upon receiving an inbound packet via one of inbound links 16, a respective one of IFCs 12 relays the packet to control unit 14. In response, control unit 14 reads data from the packet, referred to as the "key," that includes a network destination for the packet. The key may comprise one or more parts of the packet. The key may, for example, contain a routing prefix for another router within the network. Based on the destination, control unit 14 analyzes routing information 21 to select a route for the packet.

Control unit 14 further maintains flow table 20 to track traffic flow statistics associated with packet flows through the network. In particular, as router 11 receives packets, accounting module 25 generates flow statistics for each packet flow. Accounting module 25 may associate network packets with respective packet flows, and update flow table 20 to track statistics for the packets flows. For example, accounting module 25 may update flow table 20 for each packet flow to maintain an accurate packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, combinations thereof, or the like.

Control unit 14 presents user interface 24 with which clients, such as clients 10 of FIG. 1, interact to view the traffic flow statistics. In particular, clients 10 may interact with user interface 24 to issue queries to analyze and view the traffic flow statistics. In response to the queries, control unit 14 analyzes the traffic flow statistics and reports the results of the analysis to the clients via user interface 24.

Control unit 14 may maintain heap table 22 to facilitate the processing and resolution of queries from user interface 24. In particular, heap table 22 stores identifiers for the packet flows of flow table 20, and is organized as an array representation of a "heap-ordered" tree. Specifically, control unit 14 maintains heap table 22 as an array representation of a tree in which a value associated with any node in the tree is less than or equal to the value of its parent node. Control unit 14 processes heap table 22 to quickly and efficiently respond to queries received via user interface 24. For example, in response to a query, control unit 14 may process heap table 22 to quickly identify the largest packet flows according to a specified criteria, e.g., byte count. In this manner, control unit 14 need not process the traffic statistics of flow table 20, which may be voluminous, and need only process heap table 22.

Upon receiving a packet and updating flow table 20, control unit 22 updates heap table 22 to ensure that the heap table satisfies the requirements for an array representation of a heap-ordered tree. In particular, after updating the values associated with the nodes of the represented tree, control unit 22 executes a "heapify" operation to ensure that each node of the represented tree has a value that is less than or equal to the value of its parents. This process is described in more detail below.

Upon receiving a query, control unit 14 may clone heap table 22 to create one of heap table clones 26. In some instances, clients 10 may enter multiple queries to user interface 24. In this instance, control unit 12 may clone heap table 22 for each of the queries and processes each query with a respective one of the heap table clones. To ensure that packet flows are not deleted from flow table 20 while being referenced by a cloned heap table, control unit 14 may utilize reference counts in flow table 20 to account for flows currently cloned.

Control unit 14 processes each query by executing heap operations on the respective one of heap table clones 26. For example, as described in more detail below, to identify the largest M packet flows based on specified criteria, e.g., byte count, control unit 14 extracts the root node, which according to the heap properties corresponds to the largest packet flow, from the respective one of heap table clones 26. Control unit 14 then executes a heapify operation to ensures the respective one of heap table clones 26 maintains the proper heap properties. Control unit 14 repeats this process M−1 times to identify the M largest packet flows, thus satisfying the query. In this manner, control unit 14 makes use of heap table 22 to efficiently analyze dynamic flow statistics and respond to queries from clients 10. Flow table 20, heap table 22, and heap table clones 26 allow router 11 to simultaneously account for statistics and resolve queries related to dynamic packet flows.

User interface 24 returns the results of the query to clients 10. Alternatively, or in addition, router 11 may adaptively utilize the returned flow statistics. In some embodiments, for example, router 11 may set filters, update forwarding information, determine preferred routes, and the like based on the returned flow statistics.

Although discussed in reference to table data structures, flow table 20, heap table 22 and heap table clones 26 may be stored in other data structures. For example, flow table 20, heap table 22, and/or heap table clones 26 may be stored in the form of a linked list, an array, and the like. Furthermore, heap table 22 and heap table clones 26 may be any one of a binary heap, a binomial heap, a Fibonacci heap, and the like.

Control unit 14 may comprise one or more dedicated processors, hardware, and the like. The example architecture of router 11 is for exemplary purposes only, and the invention is not limited to this architecture. In alternate embodiments, router 11 may be configured in a variety of ways. In one embodiment, control unit 14 and its corresponding functionality may be replicated and incorporated directly within service cards, e.g., IFCs 12, as described in detail below.

Figure 3:
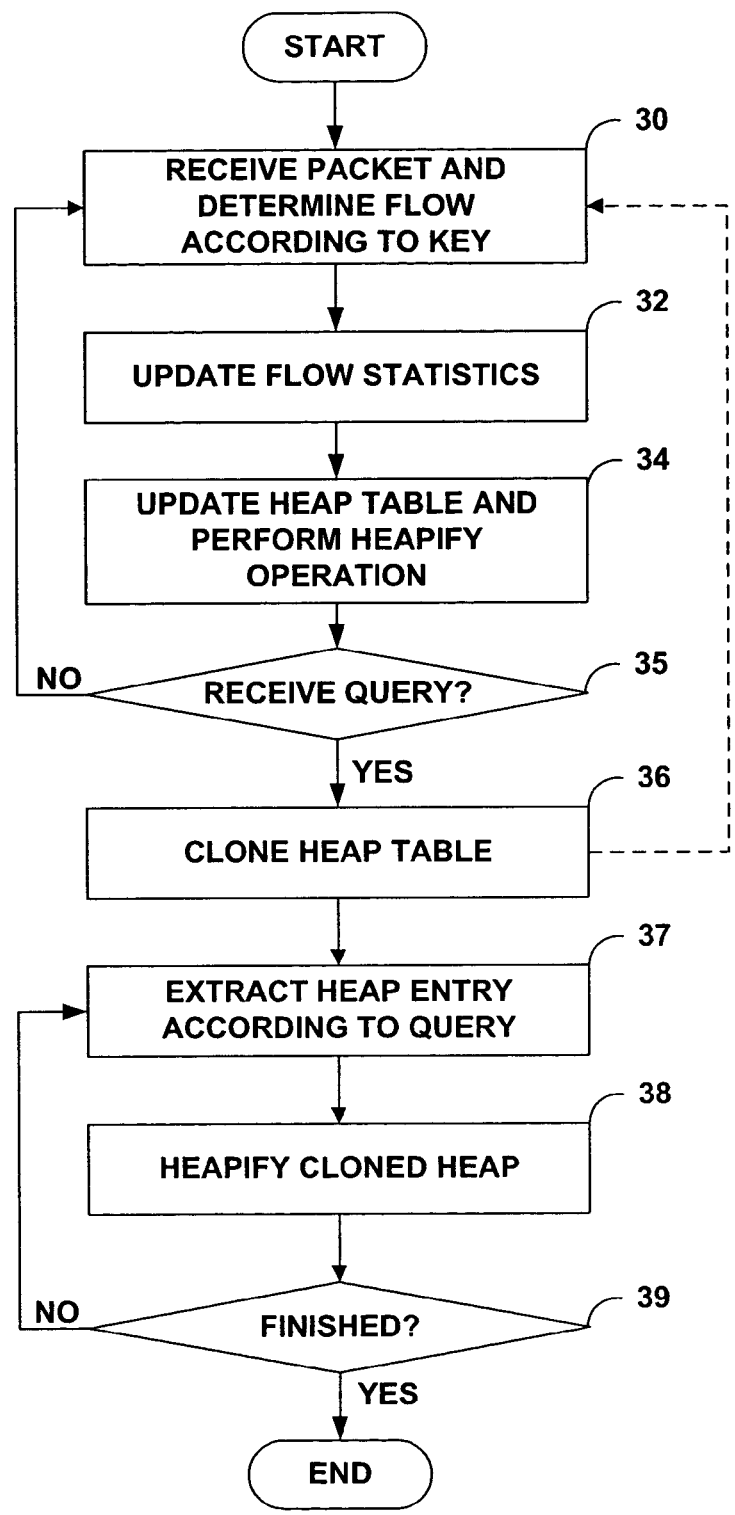
FIG. 3 is a flowchart illustrating exemplary operation of the router of FIG. 2.

FIG. 3 is a flow chart illustrating an example operation of router 11 (FIG. 2). Although illustrated for exemplary purposes in reference to a routing device, the techniques are not so limited and may be incorporated within any network device.

During operation, router 11 receives network packets via inbound network links 16 and forwards the inbound packets to control unit 14 for processing. For each received packet, control unit 14 determines a respective packet flow according to the extracted key (30), as described above. Based on the determination, control unit 14 updates flow statistics within flow table 20 (32). In addition, control unit 14 updates heap table 22 and executes a heapify operation to ensure that heap table 22 maintains its heap-ordered properties (34). In some embodiments, control unit 14 executes the heapify operation after every update to flow table 20. In other embodiments, control unit 14 executes the heapify operation after a set number of updates to flow table 20. In both cases, heap table 22 facilitates resolving queries submitted by clients 10 via user interface 24.

Upon receiving a query (35), control unit 14 clones heap table 22 to create one of heap table clones 26 (36). Simultaneous to processing the query, control unit 14 continues to update flow table 20 and heap table 22 (shown as the dashed line in FIG. 3) (30, 32, 34).

The cloned heap table, i.e., one of heap table clones 26, is a copy of heap table 22. Control unit 14 processes each query by executing heap operations on the respective one of heap table clones 26. For example, control unit 14 may extract the root node from the respective one of heap table clones 26 to identify the largest packet flow (37). Control unit 14 then executes a heapify operation on the respective one of heap table clones 26 to ensure that the clone maintains the required heap properties (38). Control unit 14 repeats this process M times to identify the M largest packet flows, where M is the requested number packet flows specified by the query, e.g., the ten largest packet flows (39). This process may be viewed as a truncated heap sort as M may be significantly smaller than the total number of packet flows represented within heap table 24.

In this manner, router 11 resolves queries in a fast and efficient manner that allows flow table 22 to be simultaneously updated. As a result, router 11 resolves the queries without impacting flow accounting. In this manner, the network device may be viewed as partitioning the traffic flow statistics into a first partition that may be updated in real-time and a second partition that may be destructively processed to satisfy the queries. Moreover, in embodiments where the techniques are incorporated within a router or other network device, e.g., a switch, the techniques allow for resolving queries without impacting packet-forwarding functions.

Figure 4A:
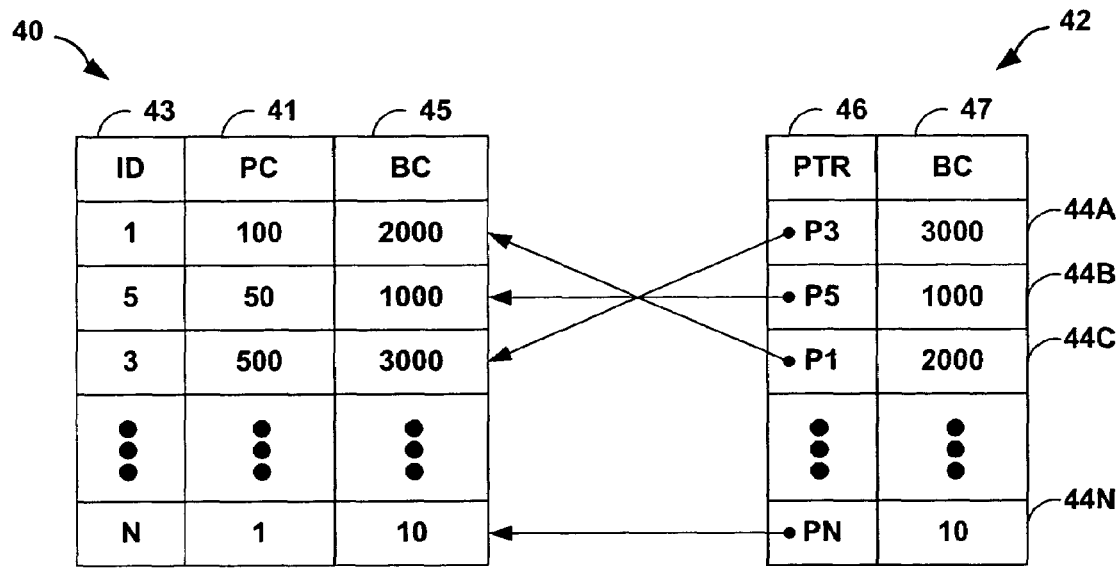
FIGS. 4A-4B are block diagrams illustrating example data structures for one embodiment of a flow table and a heap table maintained by a network device consistent with the principles of the invention.
Figure 4B:
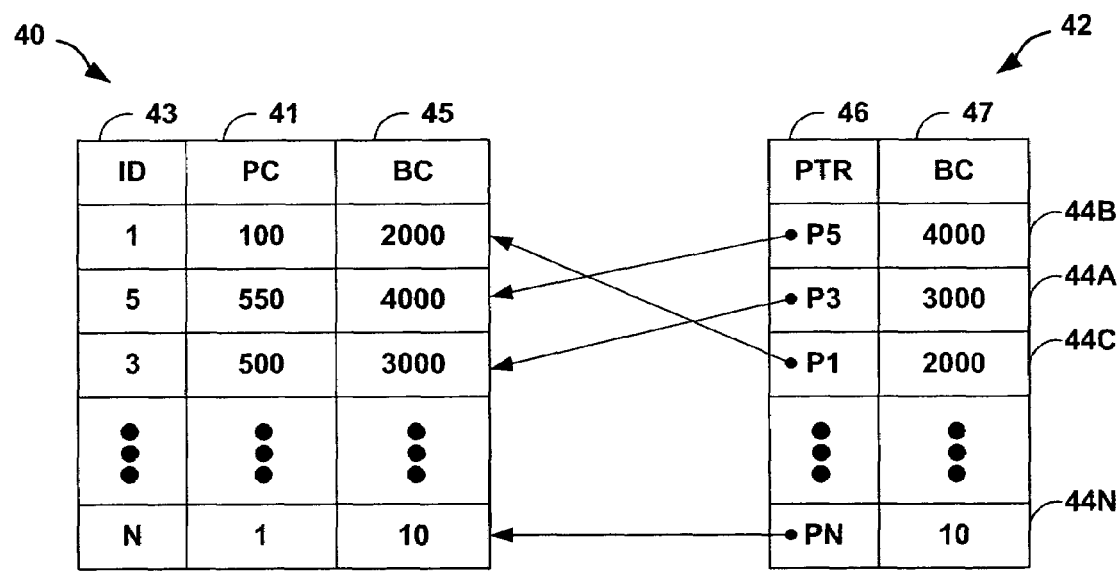

FIGS. 4A-4B are block diagrams illustrating example data structures for one embodiment of a flow table 40 and a heap table 42 maintained by a network device, such as router 11 of FIG. 2, in accordance with the principles of the invention. In the embodiment illustrated in FIG. 4A, flow table 40 and heap table 42 each comprise N rows representing packet flows with the network. Specifically, each row of heap table 42 corresponds to one of the N flows, and contains a column 46 of packet flow indicators that uniquely reference flows within flow table 40. The packet flow indicators may be, for example, pointers or indexes that identify corresponding rows within flow table 40. In some embodiments, control unit 14 may maintain more than one heap table 42 to represent flow table 40 in heap-ordered fashion based on different flow statistics. For ease of illustration, however, a single heap table 42 is depicted in FIGS. 4A and 4B.

In the illustrated embodiment of FIG. 4A, flow table 40 includes an identification (ID) column 43, a packet count (PC) column 41 and a byte count (BC) column 45. Control unit 14 assigns an ID to each flow in flow table 40 upon adding the flow to table 20. PC column 41 and BC column 45 store packet count and byte count flow statistics, respectively, for each of the flows. In this example, heap table 42 provides a heap-ordered representation of flow table 40 based on the byte count of each flow within flow table 40. Heap table 42 stores pointers in a pointers (PTR) column 46 to reference the flows in this order. Byte count (BC) column 47 of heap table 42 stores copies of the byte counts found in BC column 45. Control unit 14 executes heapify operations to maintain rows 44A-44N of heap table 42 in a heap-ordered fashion based on the byte counts of BC column 47.

In the illustrated embodiment, control unit 14 adds flows to flow table 40 and removes flows from flow table 40 based on packet flow activity within the network being monitored. For example, control unit 14 may receive routing information establishing a new route to a network destination, e.g., prefix. Control unit 14 allocates one or more entries within each of flow table 40 and heap table 42 to track flow statistics for traffic flows associated with the newly learned route. Control unit 14 may also dynamically allocate rows as flows are learned from received packets. Control unit 14 may remove a flow when traffic associated with the flow falls below a threshold for a set duration.

Control unit 14 further maintains heap table 42 to reflect changes within flow table 40. Thus, adding and removing flows from flow table 40 causes control unit 14 to further add and remove heap table rows 34. In addition to adding or removing the flows, control unit 14 updates entries within heap table 42 to reflect the updated flow statistics stored in flow table 40. Whether adding, removing, or updating entries within heap table 42, control unit 14 performs heapify operations following these actions to maintain the heap-ordered properties of heap table 42.

FIG. 4A illustrates an initial configuration of flow table 40 and heap table 42. Heap table 42 is a binary heap and sorted based on the byte count flow statistic. Heap table 42, as a binary heap, includes a root heap entry 44A. According to binary heap properties, root heap entry 44A has two child entries, heap entries 44B and 44C, both of which have byte counts less than or equal to the parent. Control unit 14 may directly access root heap entry 44A using index calculations to directly access any entry within the represented tree, such as heap entries 44B, 44C.

Upon receiving packets associated with an active packet flow, control unit 14 first updates flow table 40. FIG. 4B illustrates an updated flow table 40 and heap table 42 when control unit 14 has received packets and has updated packet and byte counts for a packet flow associated with packet flow identifier 5. Accordingly, control unit 14 has update heap table 42 to maintain the heap-ordered properties of heap table entries 44. Specifically, control unit 14 updates heap table entry 44B to reflect the incremented byte count associated with the packet flow. Upon updating heap table entry 44B, control unit 14 executes the heapify operation to ensure that heap table 42 maintains the heap-ordered property.

To apply the heapify operation, control unit 14 traverses heap table 42 and re-orders the rows of the heap table as needed to ensure that the heap table conforms to the heap-ordered property. For example, the increased byte count of heap table entry 44B has caused heap table entry 44B to exceed that of root heap entry 44A. As a result, heap table 42 does not conform to the heap-ordered property that requires the value of each node of the tree, i.e. each row, to be less than or equal to the value associated with its parent node. Thus, control unit 14 swaps heap entry 44A with heap entry 44B, as shown in FIG. 4B, to maintain this property.

The heapify operation can be applied in O(log(N)) time, where N represents the number of entries in the heap, i.e., the number of packet flows tracked in flow table 40. Control unit 14 updates and maintains the properties of heap table 42 in real-time to reflect changes within flow table 40. In this manner, control unit 14 may dynamically account for network traffic along flows within network 2 via flow table 40. Furthermore, control unit 14 represents the dynamic information, i.e., flow statistics, in heap-ordered fashion in real-time via heap table 42. This may allow for the quick and efficient generation of responses to queries submitted by clients 10 via user interface 24.

FIGS. 5A-5D are block diagrams illustrating the processing of an example heap table clone 50 in response to a query from client 10. To aid in the illustration, heap diagram 50 is depicted to illustrate a tree representation of the heap-ordered elements of heap table clone 26 throughout the process.

In this example, heap table clone 50 has been created from heap table 42 of FIG. 4B. In other words, in response to a query, control unit 14 (FIG. 2) creates a copy of heap table 42 to generate heap table clone 50. Consequently, heap table clone 50 includes pointer (PTR) column 53 and byte count (BC) column 54 similar to heap table 42. Although not shown explicitly, pointers P5', P3' and P1' of PTR column 52 reference the same packet flows within flow table 40 as pointers P5, P3 and P1 of heap table 42.

As described above, control unit 14 may receive queries from clients 10 via user interface 24. In some embodiments the queries are entered at a Command Line Interface (CLI) within user interface 24. For example, clients 10 may enter the query at a "CLI>" prompt in command form in accordance with the following syntax:

CLI > show flow detail <name service-name> <filters> <limit limit-value> <order bytes | packets>

The command begins with "show flow detail" which directs user interface 24 to display detailed flow information. Following the terms "show flow detail", clients 10 may optionally specify a service name, which may refer to any network resources. A video server that streams movies to end-users is one example of a possible service. Thus, clients 10 may specify a service name corresponding to a service, such as the video streaming service. Clients 10 may also specify filters that filter flows based on one or more criteria, such as a source prefix, a destination prefix, a source port, a destination port, an input SNMP interface index, an output SNMP interface index, a source AS, a destination AS, a type of service (TOS), and a protocol. Clients 10 may also specify a limit value M that limits the display output to the first M number of flows.

Finally, "order bytes | packets" allows clients 10 to request the flows ordered by either the highest number of byte counts or packet counts.

In the example illustrated by FIG. 5, it is assumed that control unit 14 has received a command as follows:

CLI > show flow detail limit 3 order bytes

Figure 5A:
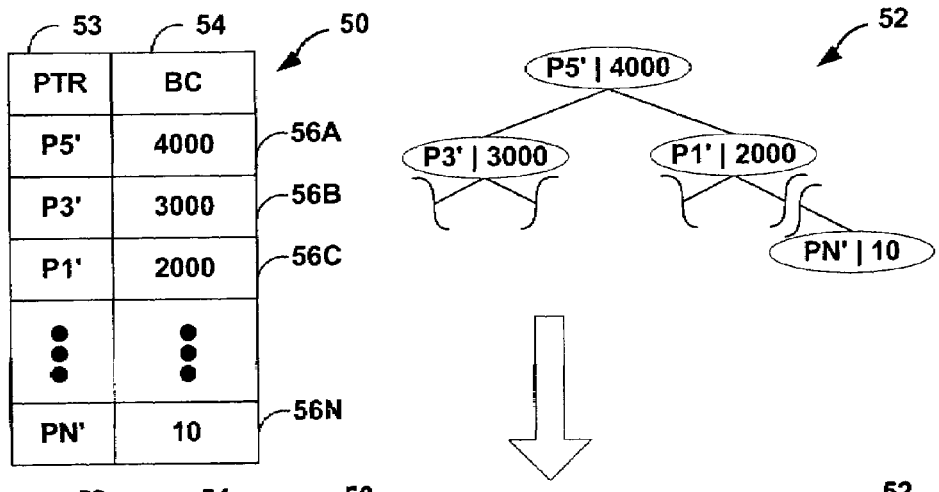
FIGS. 5A-5D are block diagrams illustrating exemplary processing of an example heap table clone in response to a query from client.
Figure 5B:
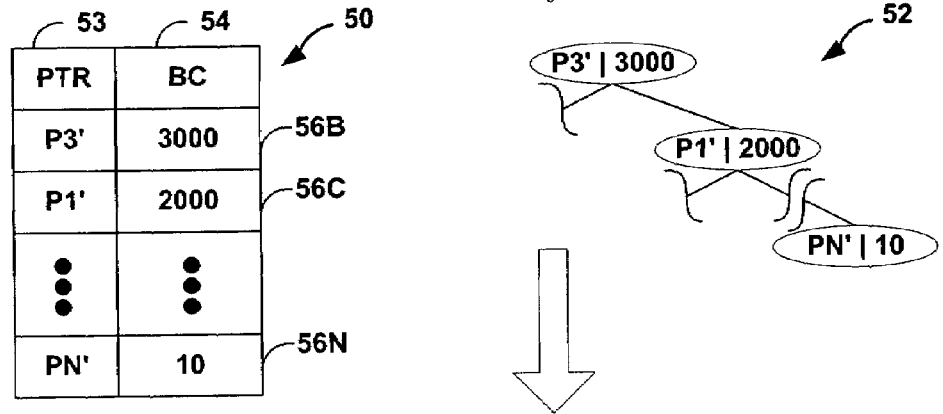

In response, control unit 14 clones heap table 42 to create heap table clone 50, as shown in FIG. 5A. Control unit 14 processes heap table clone 50 to identify and return the top three flows ordered by byte count, as requested by the command.

Specifically, control unit 14 first extracts the root, i.e., heap entry 56A. This process requires O(1) time as the root is always contained within the first row of heap table clone 50. After extracting the heap entry, control unit 14 executes the heapify operation to re-order heap table 26 in O(log(n)) time. In particular, heapify operation causes control unit 14 to determine which child entry, entries 56B and 56C, of heap entry 56A is the largest. Since in this example heap entry 56B is the largest according to byte counts, control unit 14 promotes heap entry 56B to the root and makes heap entry 56C the child of heap entry 56B, as illustrated in heap diagram 50 of FIG. 5B.

Figure 5C:
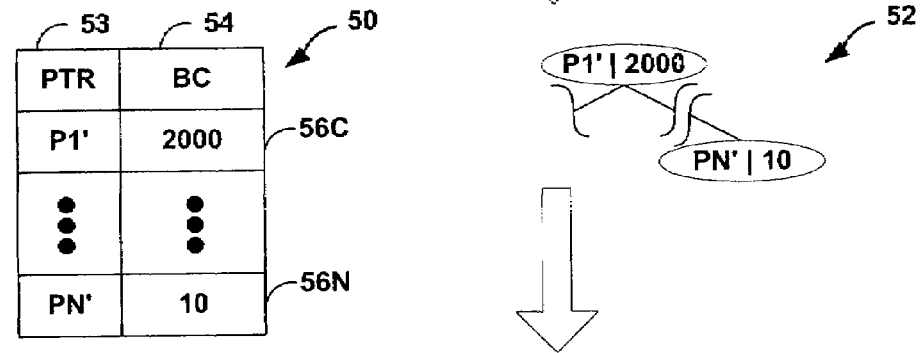
Figure 5D:
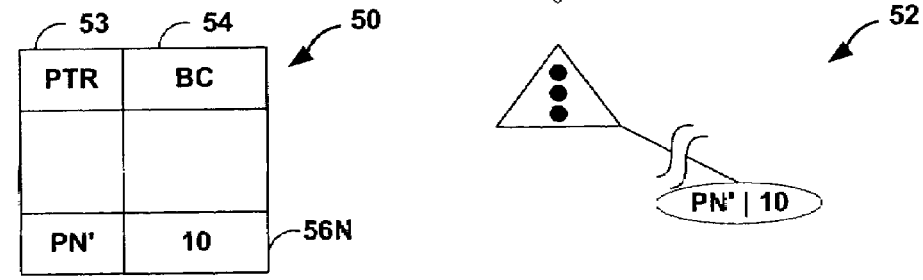

Control unit 14 continues the above-described extraction/heapify process for two more iterations to extract identifiers for the top three flows from heap table clone 50. FIG. 5C illustrates the result of extracting heap entry 56B and heapifying heap table 26. During this process, heap entry 56C becomes the root entry, which is subsequently extracted. After extracting heap entry 56C, the heapify operation resorts heap table 26, as shown in FIG. 5D. Control unit 14 may return flows in this manner to resolve queries entered, such as the exemplary query above.

In general, the limit M defined within the query determines the number of iterations that the above-described process must be performed. Each iteration can be expressed as O(1)+O(log(n)) time in big-O notation. Thus, the total time to process a query, generally takes M*[O(1)+O(log(n))] time, resulting in O(M*log(n)) after possible reductions.

In other embodiments where the heap table is not a binary heap table, the time to resolve a query may not equal the time discussed above. Thus, a binomial heap may resolve a query in a different time than the binary heap, and the invention is not limited to any particular heap-ordered representation.

Moreover, although discussed in reference to byte counts, heap table 42 (FIG. 4A) and heap table clones 50 may be sorted based on other flow statistics, such as packet count. Furthermore, multiple heap tables may exist, wherein each heap table is a heap-ordered representation of flows within flow table 40 based on different flow statistics. For example, a first heap table may provide a heap-ordered representation of flows based on byte count, and a second heap table may provide a heap-ordered representation of flows based on packet count. Heap table clones may exist for both the first and second heap table to facilitate resolving queries of these natures.

In this manner, multiple queries may be resolved simultaneous to report dynamically updating flow statistics. By cloning heap table 42, each query may be resolved without impacting flow accounting or forwarding functions. Router 11 is an exemplary network device in accordance with the principles of the invention. Other network devices with varying configuration, as described below, may utilize the techniques of the invention to efficiently provide flow statistics in real-time while maintaining accurate flow accountability.

Figure 6:
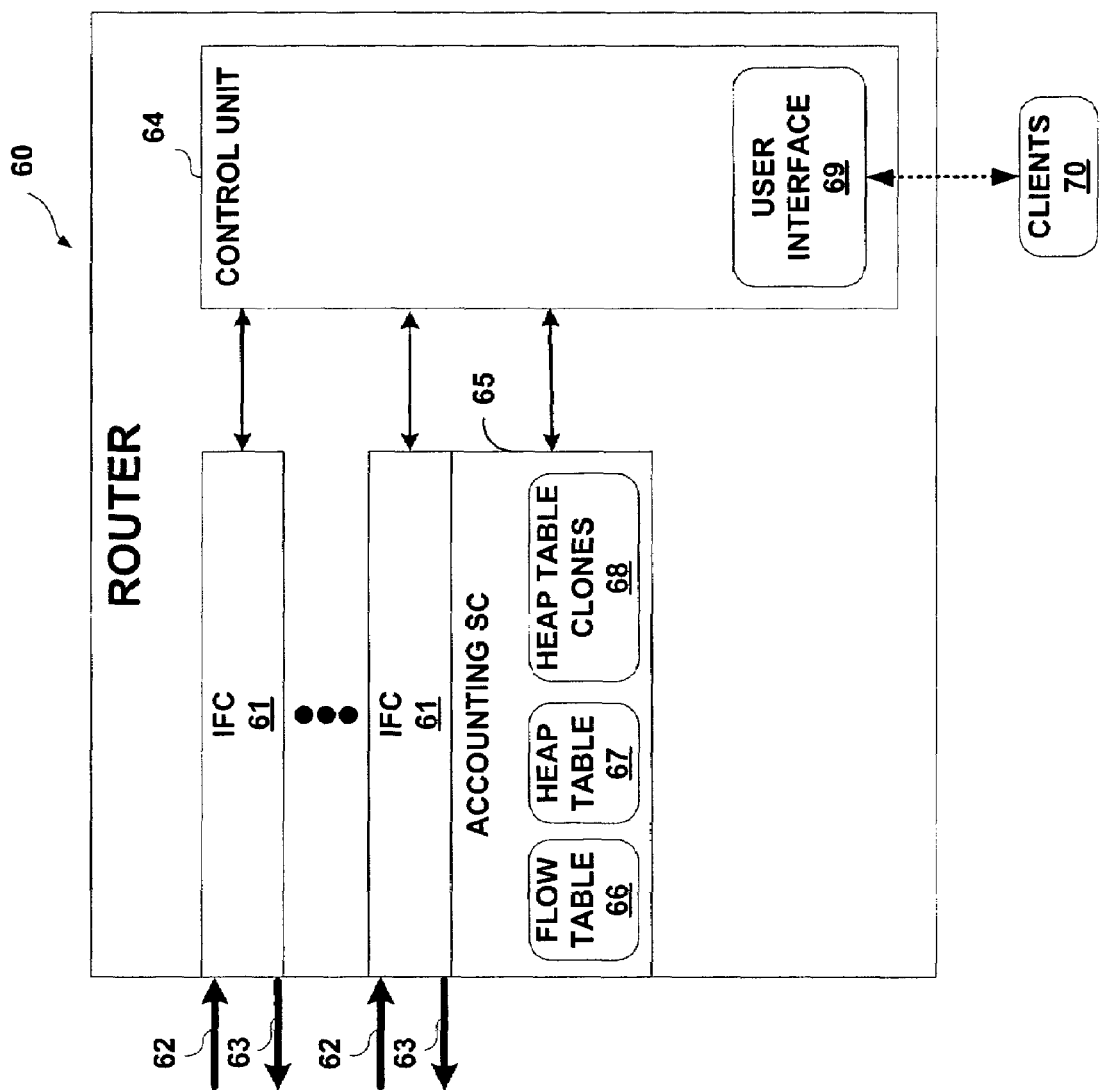
FIG. 6 is a block diagram illustrating another exemplary router in accordance with the principles of the invention.

FIG. 6 is a block diagram illustrating another exemplary router 60 in accordance with the principles of the invention. Similar to router 11 (FIG. 2), router 60 includes IFCs 61 to communicate with a network, such as network 2 (FIG. 1). IFCs 61 receive packets from the network via inbound communication links 62 and forward packets to the network via outbound communication links 63.

Router 60 further includes control unit 64 connected to IFCs 61 and a dedicated accounting service card (SC) 65. Upon receiving a packet, control unit 64 forwards the packet, or a copy thereof, to accounting SC 65. Accounting SC 65 updates flow statistics for the respective flow and stores the flow statistics in flow table 66. Furthermore, accounting SC 65 maintain heap table 67 in a heap-order according to the heap property, as discussed above, to facilitate queries submitted to router 60 via user interface 69.

Clients 70 submit queries to gather information regarding flow statistics stored in flow table 66. Control unit 64 receives the query via user interface 69, and forwards the query to accounting SC 65. Accounting SC 65 processes the query and, more particularly, clones heap table 67 to create one of heap table clones 68. Similar to the techniques described above, accounting SC 65 extracts heap table entries from the respective one of cloned heap table 68 and applies heapify operations to generate results for the query. Accounting SC 65 transmits the flow statistics according to the extracted heap table entries to control unit 64.

User interface 69 displays the returned flow statistics in accordance with a respective query. While processing queries from clients 70, accounting SC 65 continues to update flow table 66 and heap table 67. In this manner, clients 70 may quickly access flow statistics that are dynamic in nature. Moreover, use of accounting SC 65 may allow control unit 64 to achieve increased throughput as control unit 64 forwards packets while accounting SC 65 maintains flow table 66, heap table 67 and heap table clones 68.

Figure 7:
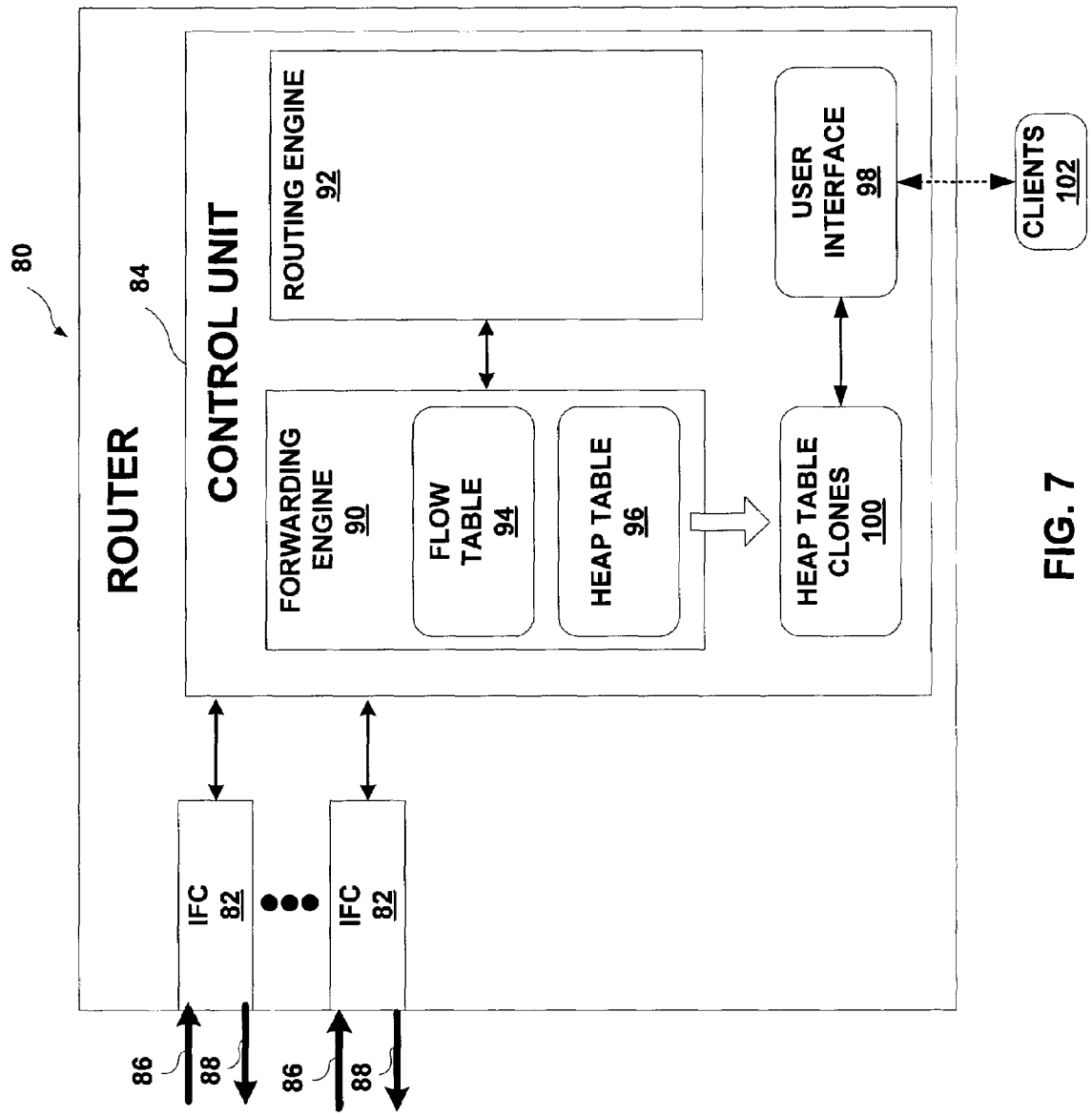
FIG. 7 is a block diagram illustrating another exemplary router in accordance with the principles of the invention.

FIG. 7 is a block diagram illustrating yet another exemplary router 80 in accordance with the principles of the invention. Similar to router 11 (FIG. 2), router 80 includes IFCs 82 to communicate with a network, such as network 2 (FIG. 1). IFCs 82 receive packets from the network via inbound communication links 86 and forward packets to the network via outbound communication links 88.

In the illustrated embodiment, control unit 84 comprises a forwarding engine 90 and a routing engine 92. Forwarding engine 90 is an engine dedicated to forwarding packets to the network. In some embodiments, forwarding engine 90 comprises a forwarding table that associates next hops with respective IFCs 82. Routing engine 92 is a dedicated engine that receives routes and performs route resolution to generate the forwarding table. Forwarding engine 90 also maintains flow table 94 and heap table 96 in accordance with the techniques described herein.

Clients 102 enter queries in command form via user interface 98. Control unit 84 receives the queries and processes the queries in accordance with the invention. In particular, control unit 84 clones heap table 96, forwarding engine 90 to continue to update flow table 94 and heap table 96. Control unit 84 uses heap table clones 100 to resolve any outstanding queries, as described above, and returns the requested flow statistics to user interface 98. User interface 98 displays the results for use by clients 102.

Various embodiments of the invention have been described. These and other embodiments are within the scope of the following claims.

The invention claimed is:

1. A method comprising:
calculating traffic statistics associated with packet flows through a network;
storing the traffic statistics within a flow table;
maintaining a heap that provides a heap-ordered representation of at least a portion of the traffic statistics of the packet flows within the flow table, wherein the heap is a tree having a root node and a plurality of other nodes arranged as parent nodes and child nodes, each of the nodes storing traffic statistics for a different one of the packet flows, and wherein the tree is heap-ordered in that a value for the traffic statistics stored in any child node of the tree is less than or equal to a value for the traffic statistics stored for its parent node within the tree;
receiving a query from a client;
processing the heap in response to the query to select one or more of the nodes of the tree while continuing to update the traffic flow statistics in the flow table in response to network traffic; and
outputting the traffic statistics associated with the selected nodes of the tree to the client.

2. The method of claim 1, wherein processing the heap comprises:
cloning the heap to produce a heap clone in the form of a tree having a root node and a plurality of other nodes arranged as parent nodes and child nodes, the nodes of the heap clone storing copies of the traffic statistics stored by the nodes of the heap; and
extracting one or more nodes from the heap clone to select the packet flows.

3. The method of claim 1, wherein calculating traffic statistics and maintaining a heap are performed concurrently with processing the heap and outputting the traffic statistics.

4. The method of claim 1, wherein maintaining a heap comprises maintaining the heap in real-time to reflect changes to the traffic statistics within flow table.

5. The method of claim 1, wherein maintaining a heap comprises maintaining a table representation of the heap.

6. The method of claim 5, wherein maintaining the heap comprises storing packet flow identifiers as elements of the table and in a heap-ordered fashion.

7. The method of claim 1, further comprising identifying the packet flows by at least one of a source network address, a destination network address, a protocol, a source port number, and a destination port number.

8. The method of claim 1, wherein calculating traffic statistics comprises:
receiving a packet from a network via an interface card of a network device; and
extracting a key from the packet;
associating the packet with one of the packet flows based on the key; and
updating the flow statistics for the associated packet flow based on contents of the packet.

9. The method of claim 8, wherein maintaining a heap comprises performing a heapify operation on the heap after receiving the packet and updating the flow statistics.

10. The method of claim 1, wherein calculating traffic statistics further comprises communicating the packets to an accounting service card of a network device, wherein the accounting service card calculates the traffic statistics.

11. The method of claim 1,
wherein receiving a query comprises receiving a query requests M ordered packet flows,
wherein processing the heap comprises cloning the heap to produce a heap clone in response to the query and performing M−1 heapify operations to extract the M ordered packet flow identifiers from the heap, and wherein outputting the traffic statistics comprises outputting the traffic statistics associated with the M packet flow identifiers.

12. A method comprising:

calculating traffic statistics associated with packet flows through a network;

storing the traffic statistics within a flow table;

maintaining a heap that provides a heap-ordered representation of the packet flows within a network based on at least one criteria associated with the packet flows, the heap-ordered representation of packet flows comprising a tree having a root node and a plurality of other nodes arranged as parent nodes and child nodes, each of the nodes storing traffic statistics for a different one of the packet flows, and wherein a value for the traffic statistics stored in any child node is less than or equal to a value for the traffic statistics stored for its parent node within the tree;

receiving a query from a client;

processing the heap in response to the query to select one or more of the nodes of the tree while continuing to update the traffic flow statistics in the flow table in response to network traffic; and outputting the traffic statistics associated with the selected nodes of the tree to the client.

13. The method of claim 12, wherein the criteria comprises one of a byte count and a packet count associated with each of the packet flows.

14. The method of claim 12, wherein processing the heap and outputting the traffic statistics comprises:

cloning the heap to produce a heap clone in response to receiving the query from the client;

extracting one or more heap entries from the heap clone to extract identifiers for the ordered subset of the packet flows; and outputting the traffic statistics associated with the extracted identifiers.

15. The method of claim 12, wherein maintaining a heap is performed concurrently with processing the heap.

16. A computer-readable medium comprising instructions for causing a programmable processor to:

calculate traffic statistics associated with packet flows through a network;

store the traffic statistics within a flow table;

maintain a heap that provides a heap-ordered representation of at least a portion of the traffic statistics of the packet flows within the flow table, wherein the heap is a tree having a root node and a plurality of other nodes arranged as parent nodes and child nodes, each of the nodes storing traffic statistics for a different one of the packet flows, and wherein the tree is heap-ordered in that a value for the traffic statistics stored in any child node of the tree is less than or equal to a value for the traffic statistics stored for its parent node within the tree;

receive a query from a client;

process the heap in response to the query to select one or more of the nodes of the tree while updating the traffic statistics in a flow table in response to network traffic; and output the traffic statistics associated with the selected nodes of the tree to the client.

17. The computer-readable medium of claim 16, wherein the instructions cause the processor to:

clone the heap to produce a heap clone; and extract one or more heap entries from the heap clone to select the packet flows.

18. The computer-readable medium of claim 16, wherein the instructions cause the processor to perform calculating traffic statistics and maintaining a heap concurrently with processing the heap and outputting the traffic statistics.

19. The computer-readable medium of claim 16, wherein the instructions cause the processor to maintain a flow table that stores traffic flow statistics for a set of packet flows.

20. The computer-readable medium of claim 16, wherein the instructions cause the processor to maintain a table representation of the heap.

21. The computer-readable medium of claim 16, wherein the instructions cause the processor to store packet flow identifiers with the heap in a heap-ordered fashion.

22. Network elements comprising:

a network interface to receive packets flows from a network;

a user interface to receive a query from a client; and a control unit coupled to the network interface, wherein the control unit computes flow statistics for the packets and maintains identifiers for the packet flows in a heap-ordered representation based on at least one of the statistics, wherein the heap-ordered representation is a tree having a root node and a plurality of other nodes arranged as parent nodes and child nodes, each of the nodes storing traffic statistics for a different one of the packet flows, and wherein the tree is heap-ordered in that a value for the traffic statistics stored in any child node of the tree is less than or equal to a value for the traffic statistics stored for its parent node within the tree, wherein the control unit processes the heap to select one or more of the identifiers in response to receiving the query from the client, and wherein the user interface outputs a portion of the traffic statistics associated with the selected identifiers.

23. The network elements of claim 22, wherein the control unit maintains the identifiers as a heap having a plurality of entries, wherein each, entry stores a respective identifier for one of the packet flows.

24. The network elements of claim 23, wherein the control unit clones the heap to produce a heap clone, and processes the heap clone to extracting the identifiers.

25. The network elements of claim 23, wherein the control unit concurrently computes the flow statistics and maintains the identifiers concurrently with processing the heap and outputting the portion of the traffic statistics.

26. The network elements of claim 23, wherein the control unit associates the packets with the packet flows by determining for each packet at least one of a source network address, a destination network address, a protocol, a source port number, and a destination port number.

27. The network elements of claim 22, wherein the control unit calculates the flow statistics and maintains the heap-ordered representation in real-time as packets are received from the interface card.

28. The network elements of claim 22, wherein the control unit comprises an accounting module that calculates the traffic statistics.

29. The network elements of claim 22, further comprising an accounting service card, wherein the control unit forwards the packets to the accounting service card to calculate the traffic statistics.

30. The network elements of claim 22, wherein the control unit comprises:
- a routing engine to maintain routing information representing a topology of the network; and
- a forwarding engine to forward the network packets in accordance with the routing information.

31. The network elements of claim 22, wherein the network device comprises one of a router, a switch, a gateway, and a hub.

32. A network device comprising:
- an interface to receive packets flows from a network;
- a control unit coupled to the interface;
- an accounting service card comprising a flow table to store flow statistics, wherein the control unit forwards the packets to the accounting service card to calculate the traffic statistics, wherein the accounting service card computes the flow statistics for the packets, and maintains a heap that provides a heap-ordered representation of the packet flows within the flow table, wherein the heap is a tree having a root node and a plurality of other nodes arranged as parent nodes and child nodes, each of the nodes storing traffic statistics for a different one of the packet flows, and wherein the tree is heap-ordered in that a value for the traffic statistics stored in any child node of the tree is less than or equal to a value for the traffic statistics stored for its parent node within the tree; and
- a user interface to receive a query from a client,
- wherein the accounting service card is configured to process the heap in response to the query to select one or more nodes of the tree while continuing to update the traffic flow statistics in the flow table in response to network traffic, and
- wherein the user interface is configured to output the traffic statistics associated with the selected nodes of the tree to the client.

33. The network device of claim 32, wherein the accounting service card further comprises
- a heap table to store the heap.

* * * * *

UNITED STATES PATENT AND TRADEMARK OFFICE
CERTIFICATE OF CORRECTION

| | |
|---|---|
| PATENT NO. | : 7,478,156 B1 |
| APPLICATION NO. | : 10/670944 |
| DATED | : January 13, 2009 |
| INVENTOR(S) | : Pereira et al. |

It is certified that error appears in the above-identified patent and that said Letters Patent is hereby corrected as shown below:

Column 14, line 20 (Claim 22), "packets" should read -- packet --

Column 14, line 43 (Claim 23), "wherein each, entry" should read -- wherein each entry --

Column 15, line 11 (Claim 32), "packets" should read -- packet --

Signed and Sealed this

Twenty-first Day of September, 2010

David J. Kappos
*Director of the United States Patent and Trademark Office*